(12) United States Patent
Zhang et al.

(10) Patent No.: US 11,614,617 B2
(45) Date of Patent: Mar. 28, 2023

(54) METHOD FOR DESIGNING FREEFORM CONCAVE GRATING IMAGING SPECTROMETER

(71) Applicants: Tsinghua University, Beijing (CN); HON HAI PRECISION INDUSTRY CO., LTD., New Taipei (TW)

(72) Inventors: Ben-Qi Zhang, Beijing (CN); Jun Zhu, Beijing (CN); Yi-Lin Tan, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/235,096

(22) Filed: Apr. 20, 2021

(65) Prior Publication Data
US 2022/0252871 A1   Aug. 11, 2022

(30) Foreign Application Priority Data
Feb. 5, 2021   (CN) .......................... 202110163594.8

(51) Int. Cl.
  *G02B 5/18*     (2006.01)
  *G02B 27/00*    (2006.01)
  *G01J 3/18*     (2006.01)
  *G01J 3/28*     (2006.01)
(52) U.S. Cl.
  CPC ............ *G02B 27/0012* (2013.01); *G01J 3/18* (2013.01); *G01J 3/2823* (2013.01); *G02B 5/1861* (2013.01)

(58) Field of Classification Search
CPC .... G01J 2003/2826; G01J 3/2823; G01J 3/18; G02B 27/0012
See application file for complete search history.

(56) References Cited

U.S. PATENT DOCUMENTS

| | | | |
|---|---|---|---|
| 9,524,565 B2 * | 12/2016 | Zhu | ..................... G02B 27/0012 |
| 10,962,413 B2 | 3/2021 | Zhu et al. | |
| 2018/0136039 A1 * | 5/2018 | Rolland | ................ G01J 3/2823 |
| 2019/0250033 A1 * | 8/2019 | Zhu | ........................... G01J 3/18 |
| 2019/0250399 A1 | 8/2019 | Zhang et al. | |

FOREIGN PATENT DOCUMENTS

| | | | | |
|---|---|---|---|---|
| TW | 201937228 | | 9/2019 | |
| TW | 201945787 | | 12/2019 | |
| WO | WO-2019129872 A1 * | 7/2019 | ......... G02B 27/0012 |

OTHER PUBLICATIONS

Lidong Wei, "Compact Dyson imaging spectrometer with large working distance using freeform surface" 2019 (Year: 2019).*

* cited by examiner

*Primary Examiner* — Maurice C Smith
(74) *Attorney, Agent, or Firm* — ScienBiziP, P.C.

(57) ABSTRACT

A method for designing a freeform concave grating imaging spectrometer includes selecting a series of light rays incident from different positions of a slit as characteristic light rays. The coordinates and normal directions of characteristic data points at intersections of the characteristic light rays and a surface of a freeform concave grating are calculated. A freeform surface shape of the freeform concave grating is obtained by fitting, so that an initial structure is obtained. Then the initial structure is optimized.

11 Claims, 4 Drawing Sheets

METHOD FOR DESIGNING FREEFORM CONCAVE GRATING IMAGING SPECTROMETER

CROSS-REFERENCE TO RELATED APPLICATIONS

This application is related to commonly-assigned application entitled, "FREEFORM CONCAVE GRATING IMAGING SPECTROMETER", concurrently filed. The entire contents of which are incorporated herein by reference.

FIELD

The present application relates to the field of optics, in particular to a method for designing a freeform concave grating imaging spectrometer.

BACKGROUND

Spectral information is very important and has a wide range of applications in the fields of biological sciences, medical health, pharmaceuticals, energy, food, and agriculture. The acquisition of spectral information relies on spectrometer and imaging spectrometer. The key element of the imaging spectrometer is the optical system with dispersion function. The optical system with dispersion function has a larger field of view, a wider spectral range, and a higher resolution. The optical system with dispersion function can promote the development of related application fields and is a goal that people have been pursuing unremittingly for a long time.

Freeform surfaces refer to non-traditional surfaces that cannot be represented by spherical or aspheric coefficients. Freeform surfaces are optical surfaces with complex surface shapes that do not have symmetry. In the past ten years, the rapid development of freeform optics has not only brought all-round improvements to the performance of optical systems, but also designed many optical systems that are difficult to design or have never been designed before, bringing a revolution in the field of optical design.

Existing imaging spectrometers do not have the freeform surfaces. The reason is that the freeform surfaces have more variables, too much degree of freedom, and there are many considerations such as the volume, weight and number of lenses of the system. It is difficult to design an imaging spectrometer with good imaging effect, a simple structure, and low cost.

Therefore, there is room for improvement in the art.

BRIEF DESCRIPTION OF THE DRAWINGS

Implementations of the present technology will now be described, by way of embodiments, with reference to the attached figures, wherein.

DETAILED DESCRIPTION

Figure 1:
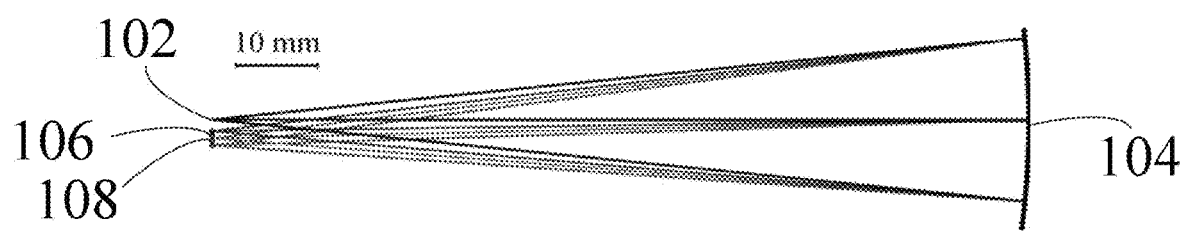
FIG. 1 shows a schematic view of an optical path of a freeform concave grating imaging spectrometer of a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to illustrate details and features better. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 2:
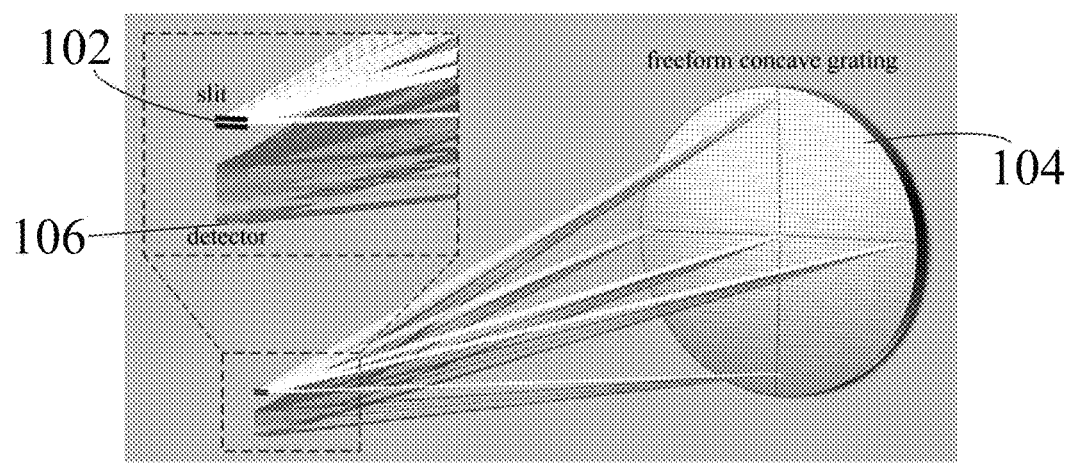
FIG. 2 shows a schematic view of the freeform concave grating imaging spectrometer of the first embodiment.

Referring to FIG. 1 and FIG. 2, a freeform concave grating imaging spectrometer 100 of a first embodiment includes a slit 102, a concave grating 104, and an image surface 108. The light is irradiated on the concave grating 101 through the slit 102 to be dispersed and reflected, to form a reflected light beam, and the reflected light beam is irradiated to the image surface 108 to form an image.

The concave grating 104 has a freeform surface, thus the concave grating 104 is a freeform concave grating 104. The freeform concave grating 104 serves as both the dispersion element and the imaging element of the freeform concave grating imaging spectrometer 100. The freeform concave grating 104 has both the functions of dispersion and imaging. The light incident from the slit 102 is irradiated on the freeform concave grating 104 to be dispersed and reflected, to form the reflected light beam. The reflected light beam is irradiated on the image surface 108, so that the light of different wavelengths incident from the slit 102 is separated and imaged separately on the image surface 108.

The freeform concave grating imaging spectrometer 100 only includes a single optical element, and the single optical element is the concave grating 104. The freeform concave grating imaging spectrometer 100 only includes the concave grating 104 as an optical element. The slit 102 and the image surface 108 are located on the same side of the concave grating 104.

The slit 102 is a narrow and long slit hole with adjustable width. The slit 102 may be a fixed slit 102, a unilateral adjustable asymmetric slit 102, or a bilateral adjustable symmetric slit 102. In one embodiment, the slit 102 is a bilateral adjustable symmetric slit 102.

The distance between two adjacent grating lines of the concave grating 104 can be defines as a line space, and the line space can be constant or variable. When the line space of the concave grating 104 is constant, the concave grating 104 has a constant line space, and the concave grating 104 is a constant line space concave grating 104. When the line space of the concave grating 104 is variable, the concave grating 104 has a variable line space, and the concave grating 104 is a variable line space concave grating 104. In one embodiment, the concave grating 104 is the freeform concave grating 104 with the constant line space. In another embodiment, the concave grating 104 is the freeform concave grating 104 with the variable line space.

The distance between two adjacent grating lines of the grating on the freeform surface is constant or variable, and the shape of the grating lines is curved or straight, which correspond to the distance and shape of the projection line of the grating line on the xy plane of the grating local coordinate system. The variable line space concave grating 104 refers to a straight stripe variable line space grating, and the distance d of the grating line at a certain point (x,y) on the mirror surface satisfies:

$$d(x,y)=d_0+d_1y+d_2y^2+d_3y^3+L \quad (1)$$

The freeform concave grating imaging spectrometer 100 further includes a detector 106 located at the position of the image surface 108, and the detector 106 is used for recording information on the image surface 108. The detector 106 can also be a photographic film or the like. In one embodiment, the freeform concave grating imaging spectrometer 100 consists of the slit 102, the concave grating 104, the image surface 108, and the detector 106.

Table 1 shows the performance parameters of the freeform concave grating imaging spectrometer 100 when the concave grating 104 is different constant line space concave grating 104 and different variable line space concave grating 104, respectively. In Table 1, the terms "Constant" represents the constant line space concave grating 104, the term "Variable" represents the variable line space concave grating 104, the term "System No." represents the freeform concave grating imaging spectrometer 100 number, the terms "Grating line-space" represent the line space of the concave grating 104, the terms "Slit length" represent the length of the slit 102, and the terms "System length" represent a distance between the slit 102 and the concave grating 104. The unit of the spectral bandwidth is nm (nanometer), the unit of the spectral dispersion is nm/mm (nanometer per millimeter) and the unit of the slit length and the system length are mm (millimeters It can be seen from Table 1 that when the concave grating 104 is the constant line space concave grating 104, the spectral range (spectral bandwidth) of the freeform concave grating imaging spectrometer 100 is in a range from 400 nm to 1000 nm, and the spectral dispersion is greater than or equal to 240 nm/mm; the length of the slit 102 is less than or equal to 2.1 mm, and the numerical aperture is less than or equal to 0.13; and the system length is greater than or equal to 61 mm, and the spectral resolving power is up to 342.

Table 1 the performance parameters of the freeform concave grating imaging spectrometer 100

| System No. | Grating line-space | Spectral bandwidth (nm) | Spectral dispersion (nm/mm) | Slit length (mm) | Numerical aperture | System length (mm) | Spectral resolving power |
|---|---|---|---|---|---|---|---|
| 1 | Constant | 400-1000 | ≥340 | 1.0 | 0.10 | 100 | 241 |
| 2 | Constant | 600-1000 | 340 | ≤2.1 | 0.10 | 100 | — |
| 3 | | | 340 | 1.0 | ≤0.13 | 100 | 313 |
| 4 | | | 340 | 1.0 | 0.10 | ≥61 | — |
| 5 | | | ≥240 | 1.0 | 0.10 | 100 | 342 |
| 6 | | 400-800 | 340 | ≤1.6 | 0.1 | 100 | — |
| 7 | | | 340 | 1.0 | ≤0.11 | 100 | 265 |
| 8 | | | 340 | 1.0 | 0.1 | ≥73 | — |
| 9 | | | ≥260 | 1.0 | 0.1 | 100 | 315 |
| 10 | Variable | 400-1000 | 340 | ≤1.8 | 0.10 | 100 | — |
| 11 | | | 340 | 1 | ≤0.14 | 100 | 338 |
| 12 | | | 340 | 1 | 0.10 | ≥52 | — |
| 13 | | | ≥140 | 1 | 0.10 | 100 | 585 |
| 14 | | 600-1000 | 340 | ≤2.3 | 0.10 | 100 | — |
| 15 | | | 340 | 1 | ≤0.16 | 100 | 386 |
| 16 | | | 340 | 1 | 0.10 | ≥37 | — |
| 17 | | | ≥100 | 1 | 0.10 | 100 | 820 |
| 18 | | 400-800 | 340 | ≤1.8 | 0.1 | 100 | — |
| 19 | | | 340 | 1 | ≤0.14 | 100 | 338 |
| 20 | | | 340 | 1 | 0.1 | ≥52 | — |
| 21 | | | ≥120 | 1 | 0.1 | 100 | 683 |

It can be seen from Table 1 that when the concave grating 104 is the variable line space concave grating 104, the spectral range of the freeform concave grating imaging spectrometer 100 is in a range from 400 nm to 1000 nm, and the spectral dispersion is greater than or equal to 100 nm/mm; the length of the slit 102 is less than or equal to 2.3 mm, and the numerical aperture is less than or equal to 0.16; and the system length is greater than or equal to 37 mm, and the spectral resolving power can reach up to 820.

In the Table 1, the spectral range of the system 1 (System No. 1) is in a range from 400 nm to 1000 nm, the length of the slit 102 is 1 mm, the numerical aperture is 0.1, the system length is 100 mm, the maximum spectral dispersion is 340 nm/mm, and the spectral resolving power is 241. At this time, the wave-front error aberration of each field of view and each wavelength of the system 1 is shown in FIG. 3.

Figure 3:
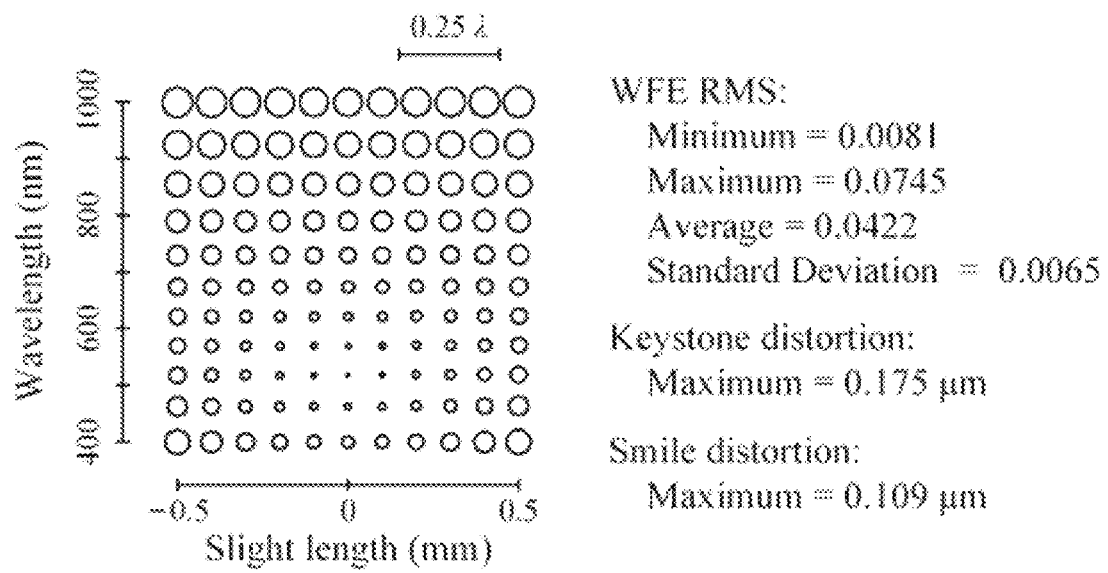
FIG. 3 shows wave-front aberrations of a system 1 with different fields of view and different wavelengths of the first embodiment.

In the FIG. 3, the abscissa is the length of the slit 102, the ordinate is the wavelength, and units of the length of the slit 102 and the length of the wavelength are mm. In the FIG. 3, the minimum of WFE RMS (wave-front error, root mean square) is 0.0081λ, the maximum of WFE RMS is 0.0745λ, the average of WFE RMS is 0.0422λ, and the standard deviation of WFE RMS is 0.0065; and the maximum of keystone distortion is 0.175 μm (micrometer), and the maximum of smile distortion is 0.109 μm.

It can be seen from FIG. 3 that in the entire working spectral range of the system 1, the maximum of the full-field wave-front error aberration RMS of each wavelength λ does not exceed 0.075λ, the imaging quality of each wavelength of the system 1 reaches the diffraction limit, thus the system 1 has good image quality. The absolute value of the smile distortion of each wavelength and the keystone distortion of each field of view point in system 1 does not exceed 1 μm. The vertical distance from the image point on the image surface 108 to the chief ray of the central field of view in the system 1 is not less than 1.4 mm, to avoid obstruction. The system 1 is telecentric in the object space.

In addition, in the system 2 (system No. 2) to the system 21 (system No. 21) of the Table 1, the maximum of wave-front error aberration RMS in the spectral range does not exceed 0.075λ, and the imaging quality has reached the diffraction limit. Therefore, the system 2 to the system 21 have good imaging quality. The absolute values of the keystone distortion and smile distortion in the system 2 to the system 21 are all less than 1 μm. The system 2 to the system 21 are all telecentric in the object space. Thus, the freeform concave grating imaging spectrometer 100 is telecentric in the object space, unobstructed, and has good imaging quality.

According to the system 1 to system 21 having the constant line space concave grating 104 or the variable line space concave grating 104 in the Table 1, it can be concluded that the variable line space concave grating 104 improves the performance parameters of the entire system, as shown in Table 2. In the Table 2, the terms "Maximum improvement" represent the maximum improvement value of the freeform concave grating imaging spectrometer 100, and the terms "From Constant To Variable" represent the change from the constant line space concave grating 104 to the variable line space concave grating 104.

Table 2 maximum improvement of performance parameters of each system when using variable line space concave grating 104 is an increase of 10%; the numerical aperture is increased from 0.13 to 0.16 at most, which is an increase of 23%; the system length is reduced from 61 min to 37 mm at most, which is an increase of 65%; and the spectral dispersion is increased from 240 nm/mm to 100 nm/mm at most, which is an increase of 140%. The maximum spectral resolving power can reach up to 820, and the spectral resolving power of the system 17 is 820. Compared with the system 5, the spectral resolving power of the system 17 is increased by 140%.

When using the variable line space concave grating 104 in the spectral range from 400 nm to 800 nm, the length of the slit 102 is increased from 1.6 mm to 1.8 mm at most, which is an increase of 12%; the numerical aperture is increased from 0.11 to 0.14 at most, which is an increase of 27%; the system length is reduced from 73 mm to 52 mm at most, which is an increase of 40%; and the spectral dispersion is increased from 260 nm/mm to 120 nm/mm at most, which is an increase of 117%. The maximum spectral resolving power can reach up to 683, and the spectral resolving power of the system 21 is 683. Compared with the system 9, the spectral resolving power of the system 21 is increased by 117%.

From the above results, it can be known that the variable line space concave grating 104 can improve the performance parameters of the system (the freeform concave grating imaging spectrometer 100) as a whole. The effect of improving the spectral dispersion and the spectral resolving power, and reducing the length of the system is particularly obvious. The improvement of the performance parameters of the system in the spectral range from 400 nm to 1000 nm is higher than the improvement of the performance parameters of the system in the spectral range from 600 nm to 1000 nm.

| Grating line-space | Maximum improvement | | | | | |
|---|---|---|---|---|---|---|
| | Spectral bandwidth (nm) | Spectral dispersion | Slit length | Numerical aperture | System length | Spectral resolving power |
| From Constant To Variable | 400-1000 | 143% | 80% | 40% | 92% | 143% |
| | 600-1000 | 140% | 10% | 23% | 65% | 140% |
| | 400-800 | 117% | 12% | 27% | 40% | 117% |

It can be seen from the Table 2 that when the spectral range is in a range from 400 nm to 1000 nm and using the variable line space concave grating 104, the length of the slit 102 is increased from 1.0 mm to 1.8 mm at most, which is an increase of 80%; the numerical aperture is increased from 0.10 to 0.14 at most, which is an increase of 40%; the system length is reduced from 100 mm to 52 mm at most, which is an increase of 92%; and the spectral dispersion is increased from 340 nm/mm to 140 nm/mm at most, which is an increase of 143%. The maximum spectral resolving power can reach up to 585, and the spectral resolving power of the system 13 is 585. Compared with the System 1, the spectral resolving power of the system 13 is increased by 143%.

When using the variable line space concave grating 104 in the spectral range from 600 nm to 1000 nm, the length of the slit 102 is increased from 2.1 mm to 2.3 mm at most, which The improvement of the performance parameters of the system in the spectral range from 400 nm to 1000 nm is higher than the improvement of the performance parameters of the system in the spectral range from 400 nm to 800 nm. The improvement amplitude of the silt length is the largest. The wavelength range of 400 nm to 800 nm has the worst improvement effect due to the short average wavelength, which is in line with the design law of the imaging optical system.

Table 3 shows the decrease of best performance of the system after the spectral range is reduced. In the Table 3, the terms "Decrease of best performance" represent the decrease of the best value of the performance parameter.

Table 3 the decrease of best performance of the system after the spectral range is reduced

|  |  | Decrease of best performance | | | | |
| --- | --- | --- | --- | --- | --- | --- |
| Grating line-space | Spectral bandwidth (nm) | Spectral dispersion | Slit length | Numerical aperture | System length | Spectral resolving power |
| Constant | From 600-1000 | −42% | −110% | −30% | −64% | −42% |
| Variable | To 400-1000 | −40% | −28% | −14% | −41% | −40% |
| Constant | From 400-800 | −31% | −60% | −10% | −37% | −31% |
| Variable | To 400-1000 | −20% | −0% | −0% | −0% | −17% |

It can be seen from Table 3 that after expanding the spectral range, the spectral dispersion and spectral resolving power of the system decrease significantly. Moreover, the decrease of various performance parameters of the system using the constant line space concave grating 104 is greater than the decrease of various performance parameters of the system using the variable line space concave grating 104. In addition, due to the smaller average wavelength in the spectral range of 400 nm to 800 nm, the system design in the spectral range of 400 nm to 800 nm is more difficult than the system design in the spectral range of 600 nm to 1000 nm. When the spectral range is expanded to 400 nm to 1000 nm, the system using the variable line space concave grating 104 does not increase the slit length, the numerical aperture, and the system length. Therefore, compared with the system using the constant line space concave grating 104, decrease of various performance of the system using the variable line space concave grating 104 is not sensitive to the expansion of the spectral range. Therefore, the use of variable line space concave grating 104 is beneficial to expand the spectral range of the freeform concave grating imaging spectrometer 100.

The freeform concave grating imaging spectrometer 100 has the following advantages: first, utilizing the high degree of freedom of the optical freeform surface shape, to realize hyperspectral imaging by using only one optical element (the freeform concave grating 104); second, the freeform surface concave grating 104 serves as a dispersive element and an imaging element at the same time, thus the freeform concave grating imaging spectrometer 100 has a simple optical path, simple structure, small volume, and low cost; third, the freeform concave grating imaging spectrometer 100 has a better imaging effect; fourth, compared with the constant line space concave grating 104, the variable line space concave grating 104 can improve the performance of the freeform concave grating imaging spectrometer 100, in particular to improving spectral dispersion and spectral resolving power, reducing the system length, and expanding the spectral range.

The second embodiment of the present invention provides a method for designing the freeform concave grating imaging spectrometer 100. The design method is as follows: first obtaining the initial structure of the freeform concave grating imaging spectrometer 100, and then optimizing the initial structure. In the design method, a point-by-point design method for an optical system with a dispersive device is used to solve the initial structure. The point-by-point design method is to first select a series of light rays incident from different positions of the slit 102 as the characteristic light rays. The coordinates and normal directions of the characteristic data points at the intersections of these characteristic light rays and the concave grating 104 are calculated, and then the freeform surface shape of the concave grating 104 is obtained by fitting, so that the initial structure is obtained. Finally, the imaging quality of the initial structure is improved through optimization, so that the freeform concave grating imaging spectrometer 100 is obtained.

Figure 4:
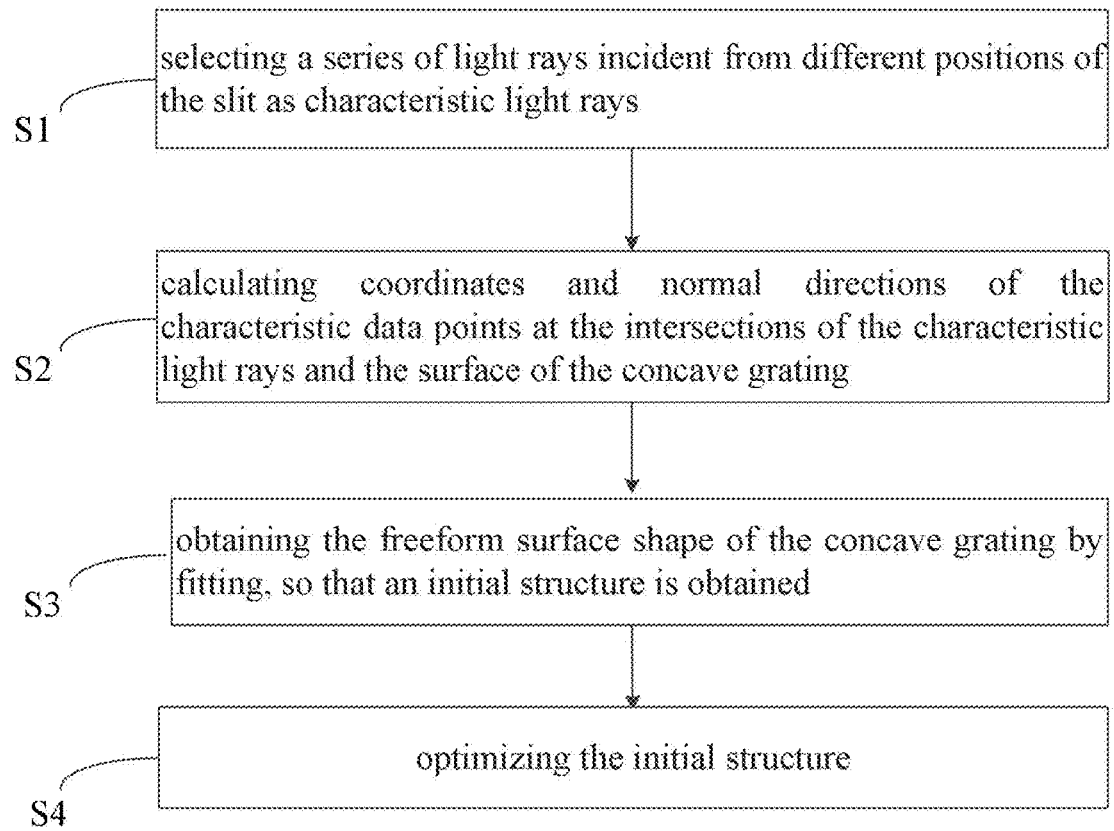
FIG. 4 shows a process flow of a method for designing the freeform concave grating imaging spectrometer of a second embodiment.

FIG. 4 show a method for designing the freeform concave grating imaging spectrometer 100 of the second embodiment, and the method includes one or more of the following steps:

S1, selecting a series of light rays incident from different positions of the slit 102 as characteristic light rays;

S2, calculating coordinates and normal directions of the characteristic data points at the intersections of the characteristic light rays and the surface of the concave grating 104;

S3, obtaining the freeform surface shape of the concave grating 104 by fitting, so that an initial structure is obtained; and S4, optimizing the initial structure.

During step S2, the concave grating 104 is the freeform concave grating 104. When using the point-by-point design method to calculate the surface shape of the concave grating 104, the coordinates of each characteristic data point on the concave grating 104 are first calculated according to the principle of closest light. Then, according to the object-image relationship of the system, the normal direction of each characteristic data point on the concave grating 104 is calculated. According to the imaging requirements of the system, the light rays emitted from different positions on the slit 102 eventually converge to different target points (ideal image points) on the image surface 108. Therefore, for a certain characteristic light, when the wavelength is λ, the direction vector S of the incident light and the direction vector S' of the outgoing light at the corresponding characteristic data point on the surface of the concave grating 104 should satisfy the grating equation. According to the generalized grating tracing equation given by Ludwig, S and S' should satisfy:

$$(S' - S) \times R = \frac{n\lambda}{d} G \times R \qquad (2)$$

Wherein, n represents the order of diffraction, λ represents the wavelength of the light, G represents the normal direction of the grating generating surface, R represents the normal direction of the characteristic data point, and d represents the distance between two adjacent grating lines at the light incident point. The n, λ, and G are known quantities, and R and d are unknown quantities.

The calculation method of the normal direction of each characteristic data point on the surface of the concave grating 104 differs according to the type of the concave grating 104. The calculation method of the normal direction of each characteristic data point on the surface of the constant line space concave grating 104 is different from the calculation method of the normal direction of each characteristic data point on the surface of the variable line space concave grating 104. The following is a specific description.

When calculating the surface shape of the constant line space concave grating 104, the grating line distance d0 must be calculated first. According to the spectral dispersion of the system and the distance between the surface of the concave grating 104 and the image surface 108, the angle of the chief ray dispersion at the center of the slit 102 can be calculated. According to the angle of the dispersion and spectral range, the grating line distance d0 that meets the requirements can be calculated. At this time, except for R in formula (2), all are known quantities, thus the value of R can be solved. The normal direction of each characteristic data point on the surface of the constant line space concave grating 104 can be obtained. The method for calculating the normal direction of each characteristic data point on the surface of the constant line space concave grating 104 includes the following sub-steps:

S21', according to the system spectral dispersion and the distance between the surface of the constant line space concave grating 104 and the image surface 108, calculating the angle of dispersion of the chief ray in the center of the slit 102;

S22', according to the angle of dispersion and spectral range, calculating the grating line distance d0 that meets the requirements;

S23', solving the value of R according to the formula $$(S' - S) \times R = \frac{n\lambda}{d} G \times R,$$

wherein n represents the order of diffraction, λ represents the wavelength of the light, G represents the normal direction of the grating generating surface, R represents the normal direction of the characteristic data point on the surface of the constant line space concave grating 104, and d represents the distance between two adjacent grating lines at the light incident point, S represents the direction vector of the incident light at the corresponding characteristic data point on the surface of the constant line space concave grating 104, and S' represents the direction vector of the outgoing light at the corresponding characteristic data point on the surface of the constant line space concave grating 104.

When calculating the surface shape of the variable line space concave grating 104, the size of the grating line distance at different characteristic data points is different, and the method for calculating the normal direction of each characteristic data point on the surface of the variable line space concave grating 104 includes the following sub-steps:

S21, setting the surface shape of the variable line space concave grating 104 to a spherical surface, wherein the intersection point of the characteristic light and the spherical surface is the characteristic data point, and the normal direction R of the spherical surface at each characteristic data point is known. At this time, in formula (2), except for d, all are known quantities, thus the grating line distance d at the characteristic data point can be solved. After the grating line distances at all the characteristic data points are solved, the function d(y) is obtained by fitting, wherein the function d(y) represents grating line distance varied with the change of the coordinate y; and S22, using the method of solving the normal direction of the characteristic data point of the constant line space concave grating 104, that is using the method of the step S23', solving the normal direction R of the characteristic data point on the variable line space grating 104, but the difference is: the value of the grating line distance d at each characteristic data point is not calculated according to the dispersion of the chief ray at the center of the slit 102, but is given by the function d(y).

During step S3, after the coordinates and normal directions of all the characteristic data points are obtained, the freeform surface shape of the constant line space concave grating 104 or the variable line space concave grating 104 is obtained by fitting.

The method for forming the freeform surface shape equation of the concave grating 104 by fitting is not limited. In one embodiment, the method for forming the free-form surface shape equation of the concave grating 104 by fitting includes the following sub-steps:

Step S1', establishing an initial curved surface and a first three-dimensional rectangular coordinate system;

Step S2', selecting K characteristic light rays $R_i$(i=1, 2, . . . , K);

Step S3', according to the object-image relationship (or light mapping relationship) and Snell's law, point by point solving the multiple intersections of each characteristic light ray and the freeform surface to be solved, to obtain multiple characteristic data points $P_i$(i=1, 2, . . . , K);

Step S4', in the first three-dimensional rectangular coordinate system, fitting the multiple characteristic data points into a spherical surface, and defining the characteristic data points corresponding to the chief ray of the central sampling field of view as the vertex of the spherical surface; and taking the vertex of the spherical surface as the origin, and the straight line passing through the center of curvature and the vertex of the spherical surface as the z axis, to establish a second three-dimensional rectangular coordinate system; and Step S5', transforming the coordinates ($x_i$, $y_i$, $z_i$) and normal vectors ($\alpha_i$, $\beta_i$, $\gamma_i$) of the multiple characteristic data points in the first three-dimensional rectangular coordinate system into coordinates ($x'_i$, $y'_i$, $z'_i$) and normal vectors ($\alpha'_i$, $\beta'_i$, $\gamma'_i$) in the second three-dimensional rectangular coordinate system, and fitting the multiple characteristic data points $P_i$(i=1, 2 . . . K) in the second three-dimensional rectangular coordinate system to form a quadric surface; removing the coordinates and normal vectors of the characteristic data points on the quadric surface in the second three-dimensional rectangular coordinate system respectively from the coordinates ($x'_i$, $y'_i$, $z'_i$) and normal vectors ($\alpha'_i$, $\beta'_i$, $\gamma'_i$), to obtain residual coordinates and residual normal vectors, and surface fitting the residual coordinates and residual normal vectors, to obtain a freeform surface; wherein the equation of the freeform surface is added to the equation of the quadric surface, to obtain the equation of the freeform surface to be solved, so that the surface shape equation of the concave grating 104 is obtained.

During step S4, the purpose of optimizing the initial structure is to improve the imaging quality of the initial structure. The method for optimizing the initial system to improve the imaging quality of the initial system is not limited, and can be implemented by using optical design software. The optical design software includes CODE V or ZEMAX OPTIC STUDIO and so on.

The method for designing the freeform concave grating imaging spectrometer 100 further includes a step of processing according to the parameters output in the step S4, so as to obtain a physical element of the freeform concave grating imaging spectrometer 100. The step of processing according to the parameters output in the step S4 is after the step S4. The physical element has a shape and is made of material, which is a physical element entity.

In addition, for the variable line space concave grating 104, while obtaining the freeform surface shape, the function of the grating line space of the variable line space concave grating 104 with the coordinate is also obtained. In order to further improve the solution effect of the surface shape equation and the line space function of the variable line space concave grating 104, and improve the image quality of the initial system, the step S3 of the method for designing the freeform concave grating imaging spectrometer 100 further includes the following sub-steps:

S31, fixing the obtained freeform surface shape, repeating the step S21 in the process of solving the surface shape of the variable line space concave grating 104, and calculating a variation function of a new grating line space;

S32, repeating the step S22 in the process of solving the surface shape of the variable line space concave grating 104, to obtain a corresponding new freeform surface shape; and S33, repeating steps S31 and S32 for iteration, so that the imaging quality of freeform concave grating imaging spectrometer 100 having the variable line space concave grating 104 is further improved.

In one embodiment, the method for designing the freeform concave grating imaging spectrometer 100 is used to obtain the system 1 to the system 21.

The method for designing the freeform concave grating imaging spectrometer 100 has the following advantages: first, quickly generating the initial solution (the initial structure) that meets the given conditions, and then optimizing, a high-quality system (the freeform concave grating imaging spectrometer 100) can be obtained, which greatly facilitates the design of different systems having different spectral range and different spectral resolving power, second, the method is simple.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may comprise some indication in reference to certain steps. However, the indication used is only to be viewed for identification purposes and not as a suggestion as to an order for the steps.

What is claimed is:

1. A method for manufacturing a freeform concave grating imaging spectrometer, comprising:
    S1, selecting a series of light rays incident from different positions of a slit as characteristic light rays;
    S2, calculating coordinates and normal directions of characteristic data points at intersections of the characteristic light rays and a surface of a freeform concave grating, wherein a line space of the freeform concave grating is constant;
    S3, obtaining a freeform surface shape of the freeform concave grating by fitting, so that an initial structure is obtained;
    S4, optimizing the initial structure; and
    S5, manufacturing a freeform concave grating imaging spectrometer according to, parameters output in the step S4, wherein the freeform concave grating imaging spectrometer is a physical element; and the freeform concave grating imaging spectrometer comprises a slit, a concave grating, and an image surface.

2. The method of claim 1, wherein a method for calculating normal direction of each characteristic data point on a surface of the freeform concave grating comprises:
    S21', according to system spectral dispersion and a distance between the surface of the freeform concave grating and an image surface, calculating an angle of dispersion of a chief ray in a center of the slit;
    S22', according to the angle of dispersion and spectral range, calculating a grating line distance d0; and
    S23', solving R according to a formula $$(S' - S) \times R = \frac{n\lambda}{d} G \times R,$$

wherein
    n represents an order of diffraction,
    $\lambda$ represents a wavelength of the light,
    G represents a normal direction of a grating generating surface,
    R represents the normal direction of the characteristic data point on the surface of the freeform concave grating,
    d represents a distance between two adjacent grating lines at a light incident point,
    S represents a direction vector of an incident light at the corresponding characteristic data point on the surface of freeform concave grating, and
    S' represents a direction vector of an outgoing light at the corresponding characteristic data point on the surface of the freeform concave grating.

3. The method of claim 1, wherein in the step S4, the initial system is optimized by using an optical design software.

4. The method of claim 1, further comprising a step of processing according to parameters output in the step S4, so that a physical element of the freeform concave grating imaging spectrometer is obtained.

5. A method for making a freeform concave grating imaging spectrometer comprising:
    S1, selecting a series of light rays incident from different positions of a slit as characteristic light rays;
    S2, calculating coordinates and normal directions of characteristic data points at intersections of the characteristic light rays and a surface of a freeform concave grating, wherein a line space of the freeform concave grating is constant;
    S3, obtaining a freeform surface shape of the freeform concave grating by fitting, so that an, initial structure is obtained; and
    S4, optimizing the initial structure; and
    S5, manufacturing a freeform concave grating imaging spectrometer according to parameters output in the step S4, wherein the freeform concave grating imaging spectrometer is a physical element; and the freeform concave grating imaging spectrometer consisting of a slit, a freeform concave grating, an image surface, and a detector; wherein the freeform concave grating is positioned to disperse and reflect a light beam irradiated from the slit, to form a reflected light beam, and the image surface is positioned to form an image from the reflected light beam irradiated from the freeform concave grating.

6. The method of claim 5, wherein a method for calculating normal direction of each characteristic data point on a surface of the freeform concave grating comprises:

S21', according to system spectral dispersion and a distance between the surface of the freeform concave grating and an image surface, calculating an angle of dispersion of a chief ray in a center of the slit;

S22', according to the angle of dispersion and spectral range, calculating a grating line distance d0; and S23', solving R according to a formula $$(S' - S) \times R = \frac{n\lambda}{d} G \times R,$$

wherein
- n represents an order of diffraction,
- $\lambda$ represents a wavelength of the light,
- G represents a normal direction of a grating generating surface,
- R represents the normal direction of the characteristic data point on the surface of the freeform concave grating,
- d represents a distance between two adjacent grating lines at a light incident point,
- S represents a direction vector of an incident light at the corresponding characteristic data point on the surface of freeform concave grating, and
- S' represents a direction vector of an outgoing light at the corresponding characteristic data point on the surface of the freeform concave grating.

7. A method for manufacturing a freeform concave grating imaging spectrometer, comprising:

S1, selecting a series of light rays incident from different positions of a slit as characteristic light rays;

S2, calculating coordinates and normal directions of characteristic data points at intersections of the characteristic light rays and a surface of a freeform concave grating, wherein a line space of the freeform concave grating is variable;

S3, obtaining a freeform surface shape of the freeform concave grating by fitting, so that an initial structure is obtained;

S4, optimizing the initial structure; and

S5, manufacturing a freeform concave grating imaging spectrometer according to parameters output in the step S4, wherein the freeform concave grating imaging spectrometer is a physical element; and the freeform concave grating imaging spectrometer comprises a slit, a concave grating, and an image surface.

8. The method of claim 7, wherein a method for calculating the normal direction of each characteristic data point on a surface of the freeform concave grating comprises:

S21, setting a surface shape of the freeform concave grating to a spherical surface, wherein an intersection point of the characteristic light and the spherical surface is the characteristic data point, and the normal direction R of the spherical surface at each characteristic data point is known; in formula $$(S' - S) \times R = \frac{n\lambda}{d} G \times R,$$

wherein
- n represents an order of diffraction,
- $\lambda$ represents a wavelength of the light,
- G represents a normal direction of a grating generating surface,
- R represents the normal direction of the characteristic data point on the surface of the freeform concave grating,
- d represents a distance between two adjacent grating lines at a light incident point,
- S represents a direction vector of an incident light at the corresponding characteristic data. point on the surface of freeform concave grating, and
- S' represents a direction vector of an outgoing light at the corresponding characteristic data point on the surface of the freeform concave grating;

except for d, all are known quantities, so that grating line distance d at the characteristic data point is solved; after the grating line distances at all the characteristic data points are solved, accordingto formula $d(x,y)=d_0+d_1y+d_2y^2+d_3y^3+L$, a function d(y) is obtained by fitting, wherein the function d(y) represents grating line distance varied with the change of the coordinate y; and S22, according to the formula $$(S' - S) \times R = \frac{n\lambda}{d} G \times R,$$

solving the normal direction R of the characteristic data point on the freeform concave grating, wherein
- n represents an order of diffraction;
- $\lambda$ represents a wavelength of the light,
- G represents a normal direction of a grating generating surface,
- R represents the normal direction of the characteristic data point on the surface of the freeform concave grating,
- d represents a distance between two adjacent grating lines at a light incident point,
- S represents a direction vector of an incident light at the corresponding characteristic data point on the surface of freeform concave grating, and
- S' represents a direction vector of an outgoing light at the corresponding characteristic data point on the surface of the freeform concave grating.

9. The method of claim 8, wherein the step S3 further comprises:

S31, fixing obtained freeform surface shape, repeating the step S21, and calculating a variation function of a new grating line space;

S32, repeating the step S22, to obtain a corresponding new freeform surface shape; and S33, repeating the steps S31 and S32.

10. The method of claim 7, wherein in the step S4, the initial system is optimized by using an optical design software.

11. The method of claim 7, further comprising a step of processing according to parameters output in the step S4, so that a physical element of the freeform concave grating imaging spectrometer is obtained.

* * * * *